Patented Apr. 28, 1931

1,803,189

UNITED STATES PATENT OFFICE

SAMUEL L. HOYT, OF SCHENECTADY, NEW YORK, ASSIGNOR TO GENERAL ELECTRIC COMPANY, A CORPORATION OF NEW YORK

HARD-METAL COMPOSITION

No Drawing.     Application filed November 26, 1929. Serial No. 410,001.

The present invention relates to hard metal compositions which are suitable for use as cutting tools. While hard metal compositions have been employed heretofore for this purpose such compositions have invariably relied upon the presence of carbon to produce a desired hardness in the finished product. The patents to Schröter Nos. 1,549,615 and 1,721,416 for example, disclose a composition which consists mainly of a carbide of an element of the 6th group of Mendelejeff's periodic table such as tungsten carbide, and an appreciable amount of a metal of the iron group, for example cobalt. In the patented disclosures the hardness is produced by carbon, the latter comprising from about 2.4 to about 9.8% of the total content of the composition, while the cobalt is employed to cement the carbide particles together and to provide the material with the desired toughness and strength.

According to the present invention I employ boron carbide as the hardening agent in a sintered composition consisting mainly of tungsten but containing appreciable amounts of boron carbide and cobalt. While a sintered composition consisting of these materials does not provide a tool which is superior to tools formed from a sintered composition consisting of tungsten carbide and cobalt such as disclosed in the above Schröter patents, it does provide a cutting tool which is far superior to high speed steel, in machining certain materials for example abrasive materials such as Mycalex, a product consisting of mica particles and glass.

In carrying out my invention, I provide a powdered mixture consisting of about 95 grams of tungsten, 5 grams boron carbide and about 15 grams cobalt. The mixture is placed in a carbon mold, as described in my copending application Serial No. 181,536, filed April 6, 1927, and pressure is applied thereto while the composition is simultaneously heated to its sintering temperature, i. e. about 1375° C. A product formed in this manner is very dense and has a hardness number of about 89 on the Rockwell A scale with 60 kilogram load.

The mixed powdered materials comprising the above composition contain about 82.7% tungsten, 3% boron, 1.3% carbon and about 13% cobalt. In simultaneously pressing and heating the materials however, some of the cobalt is usually squeezed out so that the final product may have a cobalt content as low as 5%, while the boron and carbon content would be somewhat higher than that noted above, for example about 3.5 and 1.5% respectively.

Although I prefer to form the final product by the simultaneous application of heat and pressure to the mixed powders, my invention is by no means limited to that particular process. If desired the pressing and sintering operations could be carried out separately, as in the above Schröter patents, instead of simultaneously.

In general, the composition will contain from about 3% to about 20% cobalt and from about 4.8 to about 5.8% boron carbide, the remainder of the composition consisting except for minor impurities, of tungsten. It is at present my opinion that the tungsten and boron carbide unite to form a boro-carbide. If any free carbon is present in the boron carbide, it will unite with the tungsten to form a small amount of tungsten carbide.

What I claim as new and desire to secure by Letters Patent of the United States, is:

1. A sintered metallic composition consisting mainly of a refractory metal but containing an appreciable amount of metal of the iron group and a few per cent of boron carbide.

2. A sintered composition consisting mainly of tungsten but containing from about 3% to 20% cobalt and a few per cent of boron carbide.

3. A sintered composition consisting mainly of tungsten but containing from about 3% to 20% cobalt and a small amount of boron and carbon, the boron being in excess of the carbon.

4. A sintered composition consisting substantially of tungsten, boron, carbon and cobalt, the cobalt comprising about 2 to 20%, the combined boron and carbon content about 4.8% to about 5.8% and tungsten the remainder of the composition.

5. A sintered composition consisting mainly of tungsten but containing appreciable amounts of boron and cobalt and a relatively small amount of carbon.

6. A sintered composition consisting mainly of tungsten but containing appreciable amounts of boron carbide and cobalt.

7. A sintered composition consisting mainly of tungsten but containing from a few per cent to about 20% cobalt and about 5% boron carbide, the remainder of the composition, except for minor impurities, being tungsten.

8. A sintered metallic composition consisting mainly of tungsten but containing an appreciable amount of metal of the iron group and a few per cent of boron carbide.

In witness whereof I have hereunto set my hand this 25th day of November, 1929.

SAMUEL L. HOYT.